UNITED STATES PATENT OFFICE.

DANIEL E. SOMES, OF WASHINGTON, DISTRICT OF COLUMBIA.

IMPROVED PROCESS FOR COOLING AIR.

Specification forming part of Letters Patent No. 50,286, dated October 3, 1865.

*To all whom it may concern:*

Be it known that I, DANIEL E. SOMES, of Washington, in the District of Columbia, have invented a new and useful Mode for Cooling Air; and I hereby declare that the following is an exact description of the same.

The object of my invention is to secure a cool and healthful atmosphere in any building, car, vessel, or any given space where it may be desirable to do so.

It is a well-known fact that if heat in any form be introduced into a cool room the air coming in contact with it suddenly expands and rises, giving place to other portions, which in turn undergo the same change in temperature and place. So, too, if any cold substance be admitted into a close warm room, the same agitation of the air is caused, and the temperature lowered in all parts of the room in proportion to the amount of the cold substance introduced.

Now, my invention consists in constructing and using apparatus so to make these laves available in cooling apartments. These results I accomplish by making and using a portable air-cooler capable of holding cold water or any other cold substance or mixture in separate compartments, or otherwise, with air-passages so arranged as to produce a current or currents of air.

A box or vessel made in any of the known forms, tight and strong enough to hold water and filled with ice, would to some extent answer the purpose intended; but as it is important to regulate the temperature as well as to lower it, to economize in the use of cooling agents, and also to have a thorough ventilation, I proceed to make of zinc, tin, or any suitable material a vessel in any desirable form, six to ten feet high or long, and one to three feet in diameter, more or less, according to the height and size of the room to be cooled, with an opening in the top to receive the cold substance. The upper end or head of the cooler or vessel I place a few inches below the top of the sides or cylinder to form a chamber, over which is placed an adjustable cover. I then insert one or more tubes, pipes, or channels extending perpendicularly through the ends or heads of the cooler or vessel, and open at each end to admit of a free passage of air through their entire length. Now, if this vessel be filled with ice the air in the tubes becomes cold and condensed, and consequently falls out at the bottom, drawing warm air into the upper ends of the tubes to be cooled in turn, thus keeping up a constant action of the atmosphere until it is nearly equalized in temperature throughout the room. When I wish to use two or more substances of a different temperature, I make another vessel about the same height of the one described and large enough in diameter to encircle it, with an air-space between them for a downward current. One of these vessels I fill with ice, and the other I connect with a water-pipe such as is used in cities where there are water-works. If the pipe is extended into the earth or cold water in the earth, in order to have its contents cooled, as described in Letters Patent heretofore granted to me, a small quantity of ice will be sufficient to cool the air in a room of ordinary size, and except during the very hot weather ice will not be required at all.

I sometimes construct air-channels in a spiral form in order to compel the air to travel a greater distance than it would do were they made straight, thereby more thoroughly cooling it. These spiral channels may be formed in the space between the two cylinders above descried by placing therein strips of tin or other suitable material, and winding them around the body of the inner cylinder, so as to produce the desired result and add strength to the cooler.

When I desire to secure ventilation in the room to be cooled, I conduct the air from without by means of a tube or its equivalent to the tubes in the cooler or to the chamber above the upper ends of the tubes. The cooled air within the chamber or tubes, being heavier than that which has not been cooled, falls as before described, and draws in a new supply from without, thus securing a thorough ventilation without producing a blast or dangerous draft. There should be in some part of the room an outlet with a register for the foul air to pass off.

By using stop-cocks or their equivalents in the tubes or air-ducts, I am able to regulate the current of air passing through them, or shut it off altogether, whether it comes from without the room in the manner described or is the air in the room used over and over again. A box placed on or connected with the cover of the air-chamber in the top of the cooler aforesaid and filled with ice is used to produce a rapid current of air when necessary. Charcoal or any other purifying substance may be used in said tubes or ducts for the purpose of purifying the air before it is taken into the lungs. The air may also be medicated or perfumed. Sponge, gauze, or their equivalents, I also use in the ducts to exclude the dust and insects from the room.

In order to avoid the risk of having the temperature lower than may be desirable at times the cooler may be incased with wood or other material, so as to exclude all air from the effects of the ice except that which is permitted to pass down the tubes or channels. By simply turning the valves in the tubes the volume of air passing through the tubes may be increased or diminished, thus preventing the waste of ice and regulating the temperature of the room at will.

The cooler is elevated a few inches above the floor to give free circulation of air. It should also have a shallow vessel placed beneath it to catch the sweat which may gather in the tubes and other places.

I sometimes construct the cooler in connection with refrigerators, which are used for cooling or preserving food or liquids. When it is used for cooling apartments and food at the same time I make water-tight recesses or compartments, which are more or less surrounded by the cooling liquid or cooled air; or chambers may be made and placed outside of and in contact with the cooler, so as to be cooled by its contents. I ventilate these chambers or compartments by means of air conducted through tubes, or their equivalents, passing through the cold liquid. One end of the tube opens into said chamber and the other end opens into the room in which the cooler is placed, or is connected with one of the air-tubes or air-ducts in the cooler or connected thereto; or they may be supplied by any efficient mode with air. I also attach the cooler to sideboards, desks, and other articles of furniture which may require a cool atmosphere for any purpose. For the purpose of drawing off the water, where desirable, from the cooler, I either conduct it into the waste-pipe usually found in rooms which have a supply of water from a reservoir, or insert a cock and draw the water into any convenient vessel to be drank or used in any other way.

It will be perceived that I combine a water-cooler, a refrigerator, and an air-cooler for making apartments healthful and comfortable, with a perfect system of ventilation.

Having thus described my invention, what claim as new, and desire to secure by Letters Patent, is—

A portable air-cooler when made with tubes or their equivalents, as described, and used for the purpose set forth.

D. E. SOMES.

Witnesses:
GEO. H. SHIRLEY,
L. SOMES.